(12) United States Patent
Bellm et al.

(10) Patent No.: US 7,905,138 B2
(45) Date of Patent: Mar. 15, 2011

(54) METHOD FOR CHECKING TRANSMISSION BACKLASH, AND PRODUCTION MACHINE OR ROBOT

(75) Inventors: Hubert Bellm, Stutensee (DE); Peter Krüger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 12/227,276

(22) PCT Filed: Mar. 16, 2007

(86) PCT No.: PCT/EP2007/052518
§ 371 (c)(1),
(2), (4) Date: Nov. 10, 2008

(87) PCT Pub. No.: WO2007/131819
PCT Pub. Date: Nov. 22, 2007

(65) Prior Publication Data
US 2009/0165570 A1 Jul. 2, 2009

(30) Foreign Application Priority Data
May 15, 2006 (DE) .......................... 10 2006 022 595

(51) Int. Cl.
*G01M 13/02* (2006.01)
(52) U.S. Cl. .................................................. 73/115.02
(58) Field of Classification Search .............. 73/115.01, 73/115.02, 115.03, 115.06, 115.07
See application file for complete search history.

(56) References Cited

U.S. PATENT DOCUMENTS

| | | | | |
|---|---|---|---|---|
| 5,609,058 A | * | 3/1997 | Gnadt et al. | .............. 73/162 |
| 6,255,645 B1 | | 7/2001 | Gardner, Jr et al. | |
| 7,292,954 B2 | * | 11/2007 | Deller et al. | .............. 702/115 |
| 2004/0049920 A1 | * | 3/2004 | Kollmann et al. | ............ 29/893.1 |

FOREIGN PATENT DOCUMENTS

| | | |
|---|---|---|
| DE | 3341594 C2 | 6/1984 |
| DE | 4032299 A1 | 4/1992 |
| DE | 4316817 A1 | 11/1994 |
| DE | 60000037 T2 | 12/2000 |
| EP | 1489401 A1 | 12/2004 |
| GB | 839794 A | 6/1960 |
| WO | WO 03027627 A1 | 4/2003 |
| WO | WO 2004034010 A1 | 4/2004 |

\* cited by examiner

*Primary Examiner* — Eric S McCall

(57) ABSTRACT

To determine the backlash in an arrangement in which a motor moves a load via a transmission mechanism, a transducer is used which is present anyway in conventional production machines and which measures an angular position or translatory position of the drive element or a derivative of this quantity. Via the transducer the effect of the backlash on the actual position of the drive element is measured, the actual position being different from the desired position, which is defined by the forces or torques acting on the drive. On the basis of a frequency analysis, quantities can be derived which permit the use of threshold criteria. For example, the drive is driven with a periodic signal which is close to the absorber frequency, i.e. a frequency at which the absorption by the transmission mechanism is greatest.

10 Claims, 2 Drawing Sheets

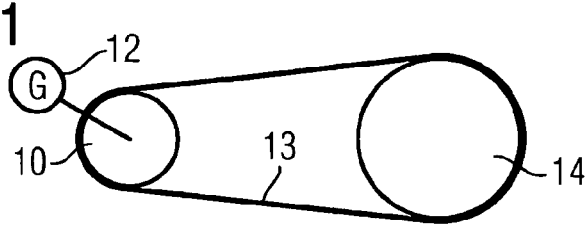
FIG 1
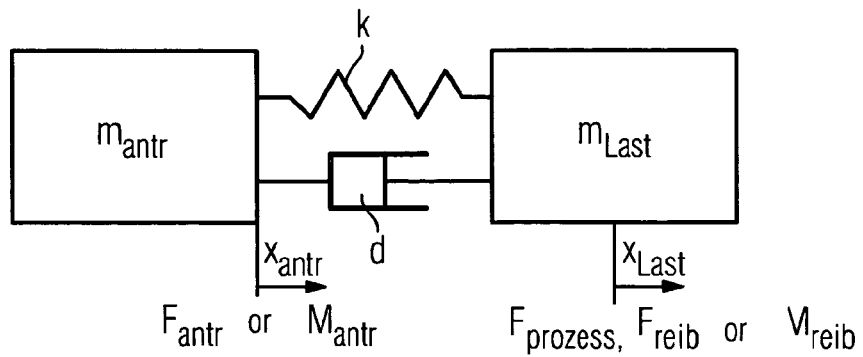
FIG 2
FIG 4A
superposed $F_{antr}$
$T_{anreg} = 1/f_{anreg}$
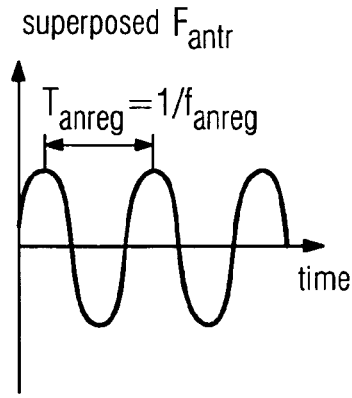
time
tensioned toothed belt
little transmission slack
⇒
large absorber effect
slack toothed belt
large transmission slack
⇒
small absorber effect
FIG 4B
$x_{antr}$
$T_{anreg} = 1/f_{anreg}$
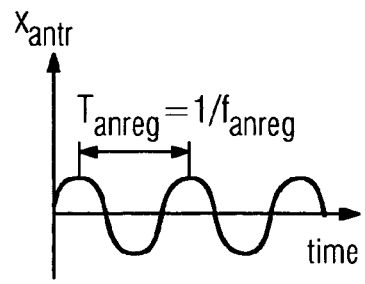
time
FIG 4C
$x_{antr}$  $T_{anreg} = 1/f_{anreg}$
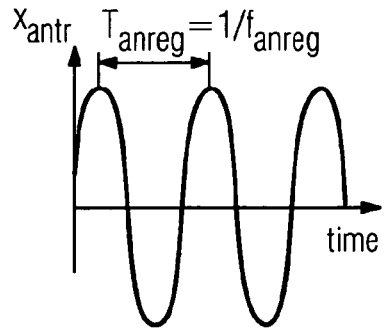
time 0.0 mm 0.67 mm 0.92 mm

METHOD FOR CHECKING TRANSMISSION BACKLASH, AND PRODUCTION MACHINE OR ROBOT

CROSS REFERENCE TO RELATED APPLICATIONS

This application is the US National Stage of International Application No. PCT/EP2007/052518 filed Mar. 16, 2007, and claims the benefit thereof. The International Application claims the benefits of German application No. 10 2006 022 595.3 DE filed May 15, 2006. Both of the applications are incorporated by reference herein in their entirety.

FIELD OF INVENTION

The present application relates to a method for checking the transmission backlash in an arrangement (such as a production machine, for example a machine tool) in which a motor moves a load via a transmission, a transducer being arranged on a drive element of the motor. It also relates to a production machine, in particular machine tool, with a motor which includes a drive element on which a transducer determines an angular position or translatory position of the drive element and/or a value derived therefrom, and with a transmission by means of which the motor transmits a force to a load.

BACKGROUND OF INVENTION

A toothed belt may be used as the transmission; however, the transmission may also include gear wheels. Usually, the transmission backlash increases constantly as a result of wear when the arrangement (production machine) is operated. If the transmission backlash becomes excessive, the operation of the machine is impaired. In the prior art the transmission backlash is monitored by the provision of purpose-made sensors. In this case, in addition to the transducer on the drive element, a second transducer (e.g. shaft encoder) is provided which determines the angular position or the position of the load downstream of the transmission. The transmission backlash is then measured directly by subtraction between the two transducers. As a rule, a second transducer is expensive.

In most cases the transmission backlash is monitored by manual checking at regular test intervals using measuring instruments. In the case of toothed belts the belt tension is measured, for example, acoustically. If the tension becomes too low and the transmission backlash therefore too large, the toothed belt is exchanged. The use of additional sensors is complex and costly. In comparison to manual monitoring of the transmission backlash, it must be ensured, in particular, firstly that excessive transmission backlash is detected reliably, and secondly that maintenance does not have to take place too early. The objective is therefore to find an optimum time for maintenance, and preferably for exchanging transmission parts.

EP 1 489 401 A1 describes a method for determining the amount of wear in a drive arrangement comprising, for example, a gear rack and a pinion. A base torque and a harmonic thereof are applied to the arrangement and a response signal, in particular the angular velocity or angular offset as a function of time, is measured by a transducer (sensor) present in the arrangement in any case. The response signal is analyzed, for example using discrete fast Fourier transformation. The response signal can be compared to a corresponding response signal which was obtained under ideal running conditions of the arrangement.

The selected harmonic of the torque is selected explicitly such that the frequency is lower than 90% of the lowest natural frequency in the arrangement. An optimum evaluation result is claimed to be obtained thereby.

SUMMARY OF INVENTION

It is an object of the invention to provide a method for checking transmission backlash which is especially efficient. A production machine of the type mentioned is to be developed correspondingly.

The object is achieved by a method with the features according to the independent claim.

The method comprises the steps:

a) application of a test control signal, which includes two periodic signals with two defined frequencies, to the motor in a base state of the arrangement (the base state preferably corresponds to a state of minimum transmission backlash at the start of operation of the machine, for example after adjustment of the transmission; the test control signal may have substantially practically any desired form, provided it contains the two periodic signals), b) measurement with the transducer of a measurement value, for example the angular position or a translatory position of the drive element (depending on whether a rotation or translatory motion of the drive element is concerned), and/or of the first and/or of the second derivative of the position, in response to the test control signal, c) determination of the ratio of the amplitudes for the two defined frequencies from the measurement value, d) application of a test control signal (which again may have practically any desired form) to the motor at a test time after operation of the arrangement since carrying out step a) (that is, when wear and therefore a large amount of transmission backlash are to be expected), e) measurement with the transducer of a measurement value, for example the angular position or a translatory position of the drive element and/or of the first and/or of the second derivative of the position, in response to the test control signal, f) determination of the ratio of the amplitudes for the two defined frequencies, g) comparison of the ratios obtained in steps c) and f) with one another or with a threshold value, and determination, on the basis of a predefined criterion, of whether the transmission backlash at the test time deviates from the transmission backlash in the base state to such an extent that maintenance is required.

The method is based on recognition of the fact that transmission backlash affects the motion of the drive element. The forces/moments of the motor, for example magnetic forces and the external forces of the load which react on the drive element through the transmission, act on the drive element. The motion of the drive element therefore results from the sum of all the forces. In certain frequency ranges, the forces of the load react on the drive element in such a manner that the motion of the drive element is heavily damped. In this case the load, in conjunction with the transmission, acts as an absorber. The absorption becomes smaller the greater the transmission backlash becomes. If the type of analysis, for example the two frequencies, is suitably selected, there are, at these frequencies, large differences in amplitudes and phases of the Fourier components in the actual signal, in relation to a predefined reference signal (predefined by the test control signal). A numerical value for the transmission backlash does not need to be determined; rather, it needs only to be determined whether the transmission backlash influences the reaction of the drive element on the transmission, i.e. the absorption, to such an extent that maintenance of the transmission is required. For this reason, various types of test control signal are possible, and there are also a large number of possibilities in determining measurement values and in deriving further values from these measurement values.

Steps a) to g) may be carried out while interrupting the process or may accompany the process.

A test signal which includes two periodic signals with two defined frequencies is used as the test signal, the ratio of the amplitudes is determined as another value, and these ratios can then be compared to one another in step g). Preferably, however, the ratio determined at the test time is compared to a threshold value. If the two frequencies are selected such that an amplitude increase occurs at the one frequency and an amplitude decrease occurs at the other frequency, with increasing transmission backlash, this effect increases mathematically as a ratio value is formed, and thereby becomes clearer.

The test control signal may also contain a multiplicity of Fourier components for frequency portions between a lower and an upper frequency, i.e. a complete frequency band. Accordingly, in steps c) and f) amplitude and phase for a whole multiplicity of frequencies can be determined. Measurement curves are then obtained, and in step g) a curve evaluation can be carried out. For example, it can be established from the curve where the so-called absorber frequency is located, that is, at which frequency the absorption is strongest. The invention, in which two frequencies were selected, implies that the location of the absorber frequency is approximately known. By contrast, the embodiment now mentioned, in which the frequency band is used at the outset, helps in seeking the absorber frequency.

The test control signal may also be a noise signal. In other words, the time curve of the test control signal does not need to be defined.

A production machine (where in the present case a machine tool may also fall under the concept of a production machine) or robot is characterized by the fact that the motor can adopt an operating state and a test state. (These states might also be defined with reference to a motor control system and not to the motor itself.) In the test state the motor receives and processes test control signals. Also in the test state, an evaluation unit evaluates measurement signals of the transducer as a function of the test control signals.

Therefore, the motor is not operated (or switched off) continuously, but is tested automatically in operating pauses or in parallel to the process.

The motor is preferably designed to adopt the test state for monitoring the transmission slack at regular time intervals. In the test state the evaluation unit then determines in each case, on the basis of a predefined criterion, whether maintenance of the transmission is required. In the event that maintenance is required, it emits a warning signal.

By virtue of this embodiment, intervention by an operator is no longer required. The motor control system automatically initiates the test state. Because this type of testing is considerably simpler than if a human operator had to carry out the test manually, the test can take place considerably more often. It is thereby avoided that maintenance takes place too frequently or, conversely, too late.

BRIEF DESCRIPTION OF THE DRAWINGS

Preferred embodiments of the invention are described below with reference to the drawing, in which:

FIG. 1 shows schematically the basic structure of an arrangement in which the invention is used;

FIG. 2 shows a physical model of the basic structure;

FIG. 4A shows a test control signal such as may be used in the invention, and

FIGS. 4B and 4C show response signals to the test control signal for two different situations.

DETAILED DESCRIPTION OF INVENTION

Figure 3A:
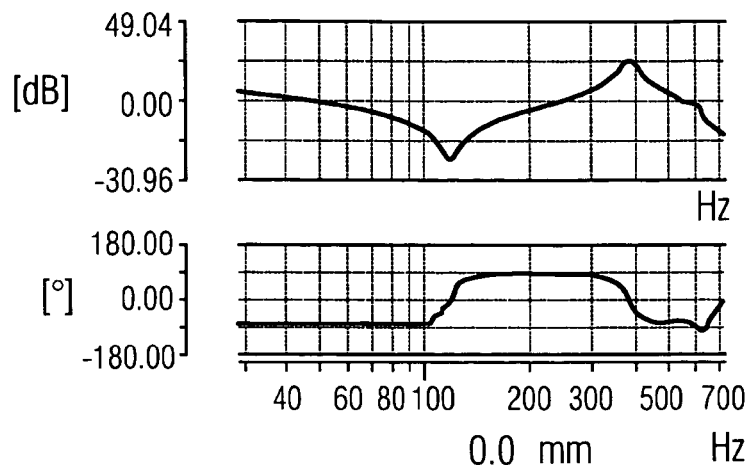
FIGS. 3A to 3C show frequency responses of amplitude and phase in an arrangement according to FIG. 1 or FIG. 2 which were recorded in connection with the invention.

An arrangement comprises a motor (drive) with a drive element 10 (e.g. a motor shaft) on which a transducer 12 measures the position of the drive element. In the example shown, this is a rotational position, that is, the angular position of the drive element 10, so that the transducer 12 may be an incremental shaft encoder. The drive element 10 exerts a force on a load 14 via a transmission 13, which may be a toothed belt or may include gear wheels. If the arrangement in FIG. 1 is a production machine the load is, for example, a sealer jaw, a ball screw drive or a robot arm.

In physical terms, a model as shown in FIG. 2 can be produced. The drive element 10 has a mass $m_{antr}$. The force $F_{antr}$ (in the case of translatory motion), or a torque $M_{antr}$ (in the case of rotary motion), acts on this mass. The mass $m_{antr}$ changes its position $x_{antr}$, where $x_{antr}$ denotes either a translatory position or an angle. (Correctly formulated, in the rotary case a mass moment of inertia J is defined instead of the mass.)

The load has a mass $m_{Last}$ on which the forces $F_{prozess}$ (process force) and friction $F_{reib}$ act. In the case of a rotary motion, a corresponding torque acts. Regardless of whether a translatory or a rotary motion is concerned, the change of position of the load 14 is described by means of the position value $x_{Last}$.

The masses $m_{antr}$ of the drive element 10 and $m_{Last}$ of the load 14 are, of course, connected to one another via the transmission, which exerts, firstly, a spring force with the spring constant k and, secondly, a damping effect with the damping constant d.

The transmission 13 therefore has the effect that the value $F_{antr}$ and $M_{antr}$ is not transmitted directly to the load. Rather, oscillation processes take place in the transmission, for example in the toothed belt 13, as a result of the spring constant k, which oscillation processes are damped with the damping constant d. This system represents (in relation to the motor shaft) an absorber. In this case, the motion of the load 14 acts on the drive element 10 by means of the transmission 13 in such a manner that the drive element 10 does not directly follow its drive force $F_{antr}$ or its drive moment $M_{antr}$. Therefore, $x_{antr}$ deviates in its actual behavior from its reference behavior.

Figure 3B:
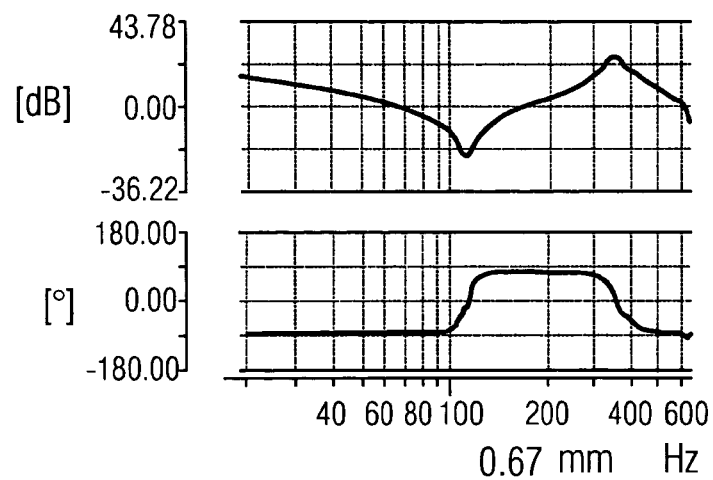
Figure 3C:
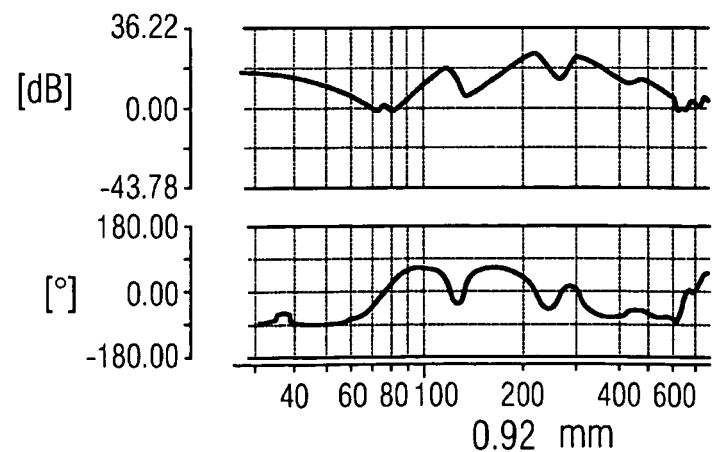

In FIGS. 3A to 3C, measurements of frequency behavior are shown for three different settings of the transmission backlash. The measuring structure used for this purpose need not be explained in detail. It is sufficient to note that the measuring structure enabled the transmission backlash to be varied by means of a screw. The millimeter figures specified in FIGS. 3A to 3C refer to a position of the screw. For interpretation, it is sufficient that FIG. 3A shows the state in which practically no transmission backlash is present, FIG. 3B shows the state with medium transmission backlash and FIG. 3C shows the state with relatively large transmission backlash.

A rotary system was used. The amplitude-frequency responses (in each case the upper curves in FIGS. 3A to 3C) show, in logarithmic representation, the ratio of the rotational speed actual value of the drive 10 to the torque reference value (which is substantially proportional to acceleration) acting on the drive element 10.

For the present purposes it is sufficient to understand that an actual value is compared to a reference value. The absorption is reflected in the actual values; more precisely, the absorption causes a major reduction in the resulting actual value of the rotational speed of the drive in relation to the torque reference value, in a frequency range in the vicinity of the absorber frequency, which results in a downwardly oriented peak in the upper curves in FIGS. 3A to 3C. The respective phases are shown below the amplitude-frequency responses in FIGS. 3A to 3C. In the region of absorption of the frequency, the phase rises from −90° to +90°.

The absorber frequency can therefore be derived from amplitude-frequency responses and phase curves of the kind shown in FIGS. 3A to 3C, as a function of the adjustment travel of the screw, which is a measure for the transmission backlash.

| Adjustment travel [mm] | Absorber frequency [Hz] |
|---|---|
| 0.0 | 103 |
| 0.5 | 102 |
| 0.67 | 101 |
| 0.84 | 90 |
| 0.92 | 73 |
| 1.0 | 60 |

In Table 1, the absorber frequency determined is shown as a function of adjustment travel.

As can be readily seen from the table, the absorber frequency varies only slightly at the start. With an adjustment travel above 0.67, the absorber frequency decreases rapidly.

In principle, sufficient information can be derived from curves of the type shown in FIGS. 3A to 3C, and from both the amplitude-frequency response and the phase curve, to determine whether the transmission backlash is too great. From the sharp drop in the absorber frequency in the range between 0.67 and 0.84 in Table 1, it can be deduced that a rapid deterioration of the drive occurs precisely between these values of the adjustment travel, and that the transmission must be exchanged or adjusted. (Of course, with the use of the measurement structure not explained in detail here this does not apply, since the transmission backlash is generated artificially. With real systems, it can be recognized clearly from the change in the absorber frequency that the transmission backlash is becoming excessive.)

In principle, it is not necessary to analyze a whole spectrum, as is done for FIGS. 3A to 3C.

Rather, it is possible to select a particular frequency for excitation of the system in a tailored manner. FIG. 4A shows a test control signal which is applied to the drive element 10 and which is purely periodic, with an excitation frequency $f_{anreg}$ and therefore with a period $T_{anreg}=1/f_{anreg}$. The absorber frequency of the system with a tensioned toothed belt with little transmission backlash was selected for $f_{anreg}$.

In the event that the toothed belt 13 is tensioned and the transmission backlash is small, the curve shown in FIG. 4B is obtained when measuring the value $x_{antr}$ by means of the transducer 12. The response signal is naturally also periodic, with the same period $T_{anreg}$, and has a low amplitude in relative terms.

If a large amount of transmission backlash is present, i.e. the toothed belt 13 is loose, a curve as shown in FIG. 4C is obtained when measuring $x_{antr}$ with the transducer 12. (In this case the same scales are assumed for the y-axis in comparison to FIG. 4B, although in the present case they are represented in arbitrary units.)

The amplitude of the Fourier component $f_{anreg}$ is therefore increased if a large amount of transmission backlash is present, as compared to the case when little transmission backlash is present. This amplitude alone is therefore sufficient as a criterion for determining whether or not the transmission backlash is excessive.

As a rule, a ratio value between the amplitude of oscillation for the curve in FIG. 4C in comparison to FIG. 4B will be formed. If this value exceeds a threshold value (which is to be defined as a function of the position $f_{anreg}$ in relation to the absorber frequency in the base state), it can be determined by means of a threshold criterion when maintenance should take place and when it should not.

The example explained with reference to FIGS. 4A to 4C applies only to a given frequency. There are also frequencies at which the amplitude decreases with an increase of transmission backlash. In those cases, too, ratio values can be defined and threshold criteria applied.

The case represented in FIGS. 4A to 4C relates to an excitation frequency $f_{anreg}$ which is lower than that the absorber frequency. The opposite case therefore applies when the frequency $f_{anreg}$ is higher than the absorber frequency.

Thus, the following values can, for example, be obtained: in a measurement with the test frequency 80 Hz, the amplitude 100 (arbitrary unit) is obtained with a tensioned toothed belt and the amplitude 80 with a loosened toothed belt. With a test frequency of 110 Hz the amplitude 200 is obtained with a tensioned toothed belt and the amplitude 240 with a loosened toothed belt. Because the amplitude is lowered by loosening the toothed belt at the frequency of 80 Hz, and the amplitude is increased by loosening the toothed belt at the frequency of 110 Hz, the amplitude ratio, for example the amplitude at 80 Hz in comparison to the amplitude at 110 Hz, can be defined. With the above-mentioned exemplary values, the amplitude ratio with a tensioned toothed belt is therefore 0.5, and with a loosened toothed belt 0.33. The change is therefore reflected more strongly in the numerical value than in the individual values, so that the amplitude ratio is an especially suitable value, which is therefore used in the invention claimed.

The test control signal does not necessarily contain only two frequency components. Rather, it is also possible to subject the motor or the drive element 10 to noise signals. Although analysis of the measurement values obtained by the transducer 12 is not quite so simple in this case, curves of the type shown in FIGS. 3A to 3C can nevertheless be derived.

The invention claimed is:

1. A method for checking the transmission backlash in an arrangement, in which a motor moves a load via a transmission, a transducer being arranged on a drive element of the motor, comprising:
  applying a first test control signal, which includes two periodic signals with two defined frequencies, to the motor in a base state of the arrangement;
  measuring by the transducer a first measurement value in response to the first test control signal;
  determining a first ratio of the amplitudes for the two defined frequencies from the first measurement value;
  applying a second test control signal to the motor at a test time after applying the first test control signal;

measuring by the transducer a second measurement value in response to the second test control signal;

determining a second ratio of the amplitudes for the two defined frequencies from the second measurement value;

comparing the first ratio and second ratio of the amplitudes with one another or with a threshold value; and determining, on the basis of a predefined criterion, of whether the transmission backlash at the test time deviates from the transmission backlash in the base state to such an extent that maintenance of the transmission is required.

2. The method as claimed in claim 1, wherein the first test control signal and the second test control signal include a plurality of Fourier components for frequency portions between a lower and an upper frequency.

3. The method as claimed in claim 1, wherein the first test control signal and the second test control signal are noise signals.

4. The method as claimed in claim 2, wherein the first test control signal and the second test control signal are noise signals.

5. The method as claimed in claim 1, wherein the arrangement is a production machine, the production machine comprising:
a motor which includes a drive element on which a transducer determines an angular position and translatory position of the drive element and a value derived therefrom, wherein the motor adopts an operating state and a test state, and wherein the motor receives and processes test control signals in the test state,
a transmission via which the motor transmits a force to a load, and
an evaluation unit which evaluates measurement signals of the transducer as a function of the test control signals.

6. The method as claimed in claim 1, wherein the arrangement is a production machine, the production machine comprising:
a motor which includes a drive element on which a transducer determines an angular position and translatory position of the drive element or a value derived therefrom, wherein the motor adopts an operating state and a test state, and wherein the motor receives and processes test control signals in the test state,
a transmission via which the motor transmits a force to a load, and
an evaluation unit which evaluates measurement signals of the transducer as a function of the test control signals.

7. The method as claimed in claim 5, wherein the motor is designed to automatically adopt the test state for checking the transmission slack at test intervals, wherein the evaluation unit determines in the test state, on the basis of a predetermined criterion, whether maintenance of the transmission is required, and emits a warning signal in the event that maintenance is required.

8. The method as claimed in claim 1, wherein the arrangement is a robot, the robot comprising:
a motor which includes a drive element on which a transducer determines an angular position and translatory position of the drive element and a value derived therefrom, wherein the motor adopts an operating state and a test state, and wherein the motor receives and processes test control signals in the test state,
a transmission via which the motor transmits a force to a load, and
an evaluation unit which evaluates measurement signals of the transducer as a function of the test control signals.

9. The method as claimed in claim 1, wherein the arrangement is a robot, the robot comprising:
a motor which includes a drive element on which a transducer determines an angular position and translatory position of the drive element or a value derived therefrom, wherein the motor adopts an operating state and a test state, and wherein the motor receives and processes test control signals in the test state,
a transmission via which the motor transmits a force to a load, and
an evaluation unit which evaluates measurement signals of the transducer as a function of the test control signals.

10. The method as claimed in claim 8, wherein the motor is designed to automatically adopt the test state for checking the transmission slack at test intervals, wherein the evaluation unit determines in the test state, on the basis of a predetermined criterion, whether maintenance of the transmission is required, and emits a warning signal in the event that maintenance is required.

* * * * *